(12) United States Patent
Szumer

(10) Patent No.: US 6,553,677 B2
(45) Date of Patent: Apr. 29, 2003

(54) COMBINATION SQUARE

(75) Inventor: Manny Szumer, Bikat Beit Hakerem (IL)

(73) Assignee: Kapro Industries Ltd., Bikat Beit Hakerem (IL)

( * ) Notice: Subject to any disclaimer, the term of this patent is extended or adjusted under 35 U.S.C. 154(b) by 11 days.

(21) Appl. No.: 09/757,648

(22) Filed: Jan. 11, 2001

(65) Prior Publication Data

US 2002/0088130 A1 Jul. 11, 2002

(51) Int. Cl.[7] ................... B43L 7/14; B43L 7/00
(52) U.S. Cl. .................. 33/480; 33/427; 33/334; 33/354
(58) Field of Search .............. 33/480, 427, 334, 33/354, 418, 419, 452, 465, 472, 473, 474, 383, 384

(56) References Cited

U.S. PATENT DOCUMENTS

| | | | | |
|---|---|---|---|---|
| 1,096,782 A | * | 5/1914 | Freytag | 33/473 |
| 1,133,936 A | * | 3/1915 | Coughlin | 33/384 |
| 2,025,473 A | * | 12/1935 | Plumb | 33/419 |
| 2,409,849 A | * | 10/1946 | Grey | 33/473 |
| 2,412,100 A | * | 12/1946 | Smith | 33/418 |
| 2,448,440 A | * | 8/1948 | King | 33/427 |
| 2,508,111 A | * | 5/1950 | Hassell | 33/473 |

* cited by examiner

*Primary Examiner*—Christopher W. Fulton
(74) *Attorney, Agent, or Firm*—David Klein; Dekel Patent Ltd.

(57) ABSTRACT

A combination square including a body including two opposing members, each having a plurality of straightedged surfaces, and a clamping element adapted to clamp the opposing members together, the opposing members defining a recess therebetween for receiving therein a rule member.

18 Claims, 5 Drawing Sheets

COMBINATION SQUARE

FIELD OF THE INVENTION

The present invention relates generally to combination squares.

BACKGROUND OF THE INVENTION

A combination square is a well known instrument used by carpenters, mechanics, tool makers, artisans, handy men and the like, which has a body (also referred to as "head") that typically slides in a groove formed in a rule. The body may be locked in place at any point along the rule, generally by means of a screw. The body of the combination square is generally formed with smooth surfaces set at 90° and 45°, for constructing or checking right angles and 45° angles.

The combination square as known today, was first disclosed by Laroy Sunderland Starrett in U.S. Pat. No. 282,583 in 1883. The Starrett combination square has a bubble vial set in the body for leveling or plumbing surfaces. The body is locked in place by means of a thumbscrew.

Other types of pioneering combination squares include an adjustable square described in U.S. Pat. No. 715,703 to Starrett, a miter and try square of U.S. Pat. No. 1,213,578 to Christian Bodmer, and a pivoting combination square of U.S. Pat. No. 1,948,951 to Austin L. Stowell, both assigned to the Stanley Works Co., and another pivoting combination square of U.S. Pat. No. 1,525,813 to Edward P. King, assigned to the L. S. Starrett Co.

All of the above squares use a transverse rib or nib, advanced by a thumbscrew or similar mechanism, to clamp the body to the rule, and retracted to release the body from the rule. The rib abuts against the longitudinal groove of the rule, rather than on a flat surface thereof. It is well known that it is, at times, very annoying and/or difficult for a person to reinsert the transverse rib back into the longitudinal groove extending in the face of the conventional rule member, when the rule member is slipped entirely free from the body or head of the square. It is a nuisance even to adjust the position of the rule as the rule does not slide well once the rib has been released.

Attempts have been made in the prior art to overcome the transverse rib problem. Examples of patents that do away with such a rib/nib include U.S. Pat. No. 1,519,209 to J. W. Parker in 1925, U.S. Pat. No. 2,296,531 to R. T. McQueen in 1942, U.S. Pat. No. 2,448,440 to E. I. King in 1948, and the more recent U.S. Pat. No. 4,028,814 to Andrews in 1977. In all of these patents, the head of the combination square is clamped straight down against the face of the rule member by means of a thumbscrew.

However, other than innovations in pivoting and clamping straight down against the rule member itself, the basic design of Starrett has changed little over the years.

SUMMARY OF THE INVENTION

The present invention seeks to provide an improved combination square. In one preferred embodiment, the body of the combination square includes two opposing members, each having a plurality of straightedged surfaces. The opposing members define a recess for receiving therein a rule member. A clamping element clamps the opposing members together. The clamping element turns about a turning axis to apply a clamping force via the body on the rule member. In contrast to the prior art, the turning axis does not traverse the rule member. The clamping element preferably mates with a bubble vial housing. The combination square has other features, which are described more in detail hereinbelow.

There is thus provided in accordance with a preferred embodiment of the present invention a combination square including a body including two opposing members, each having a plurality of straightedged surfaces, and a clamping element adapted to clamp the opposing members together, the opposing members defining a recess therebetween for receiving therein a rule member.

In accordance with a preferred embodiment of the present invention the opposing members are generally mirror images of each other Further in accordance with a preferred embodiment of the present invention the rule member has a longitudinal groove formed therein, wherein the opposing members clamp against the longitudinal groove.

Still further in accordance with a preferred embodiment of the present invention the opposing members include a fulcrum against which they pivot to release the rule member.

In accordance with a preferred embodiment of the present invention the clamping element is attachable to the body and rotatable about a turning axis so as to apply a clamping force via the body on the rule member, the turning axis not traversing the rule member.

Further in accordance with a preferred embodiment of the present invention a bubble vial housing is provided, which is adapted to be secured to the body, the bubble vial housing including a clamp-receiving portion, wherein the clamping element mates with the clamp-receiving portion.

Still further in accordance with a preferred embodiment of the present invention the body is formed with a plurality of notches, and the bubble vial housing is adapted to be secured in a first orientation in at least one of the notches, and to be secured in a second orientation, rotated with respect to the first orientation, in at least one of another of the notches. The notches are preferably arranged such that the vial is parallel to the straightedged surfaces.

Each of the straightedged surfaces is preferably adapted to have a rule member pass therethrough. In one embodiment, a plurality of the rule members pass through at least one of the straightedged surfaces at one time.

In accordance with a preferred embodiment of the present invention some of the plurality of straightedged surfaces are angled with respect to each other at 45° and 90°, and at least one additional straightedged surface is angled with respect to the other straightedged surfaces at an angle different from 45° and 90°.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
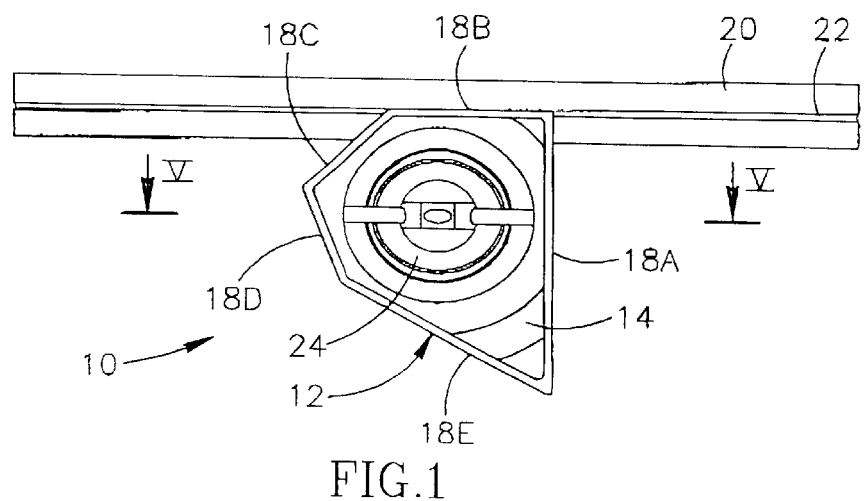
FIGS. 1, 2 and 3 are simplified pictorial illustrations (front, rear and side views, respectively) of a combination square, constructed and operative in accordance with a preferred embodiment of the present invention.
Figure 2:
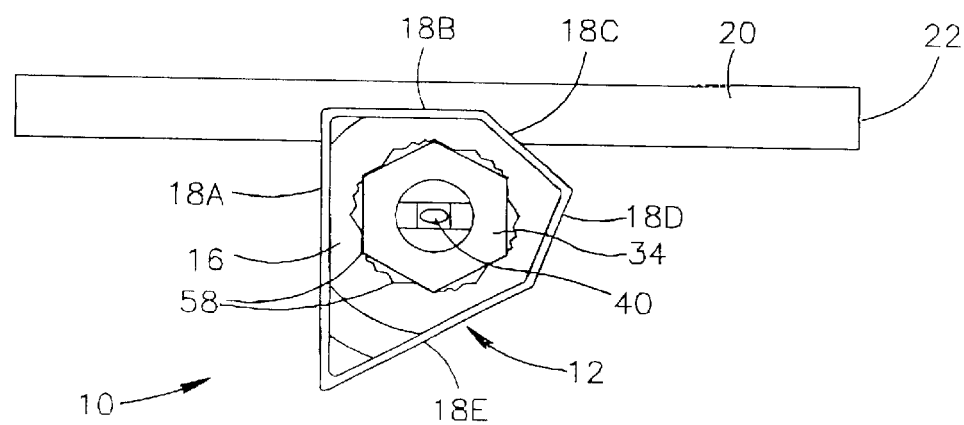
Figure 3:
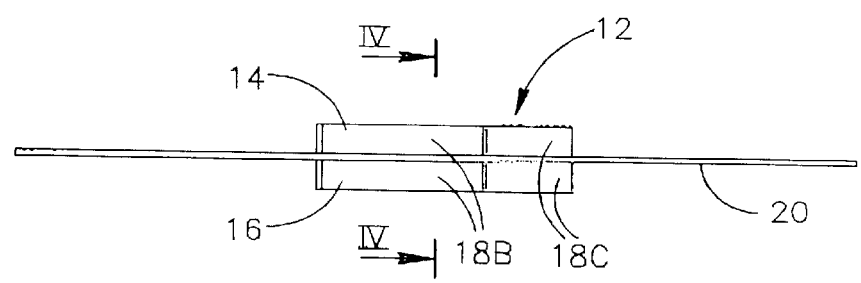

Reference is now made to FIGS. 1–3, which illustrate a combination square 10, constructed and operative in accordance with a preferred embodiment of the present invention.

Combination square 10 preferably includes a body 12 comprising two opposing members 14 and 16, each of which has a plurality of straightedged surfaces, designated in the illustration as straightedged surfaces 18A, 18B, 18C, 18D and 18E. (It is noted that this is just one example, and opposing members 14 and 16 may have any other number of straightedged surfaces.) Opposing members 14 and 16 are preferably generally mirror images of each other, such that the combination square 10 may be flipped over and used on either side. Opposing members 14 and 16 clamp down on a rule member 20 in a manner described more in detail hereinbelow with reference to FIGS. 4 and 5. Opposing members 14 and 16 may be made of any suitable sturdy and durable material, such as cast steel or zinc, or molded glass-reinforced plastic, for example. Rule member 20 may be made of steel or plastic as well, for example. Rule member 20 is preferably formed with a longitudinal groove 22 as is known in the art.

Straightedged surfaces 18A and 18B preferably form a 90° angle. Straightedged surfaces 18B and 18C preferably form a 45° angle. Straightedged surfaces 18C and 18D preferably form a 90°+22.5°=112.5° angle. Straightedged surfaces 18D and 18E preferably form a 120°+22.5°=142.5° angle. (Straightedged surfaces 18C, 18D and 18E are suitable for setting, marking and checking 22.5° angles, when body 12 is placed against a surface.) Straightedged surfaces 18E and 18A preferably form a 60° angle. It is appreciated that these are just examples, and other angles are possible within the scope of the invention.

A clamping element 24 is provided for clamping opposing members 14 and 16 together. Referring additionally to FIGS. 6–9, clamping element 24 preferably has a generally circular shape (although any arbitrary shape is within the scope of the invention), with an internally threaded shank 26, and a pair of finger grips 28. Clamping element 24 turns about a turning axis 30, and is placed through a recess 32 (FIG. 5) formed in member 14.

Figure 10:
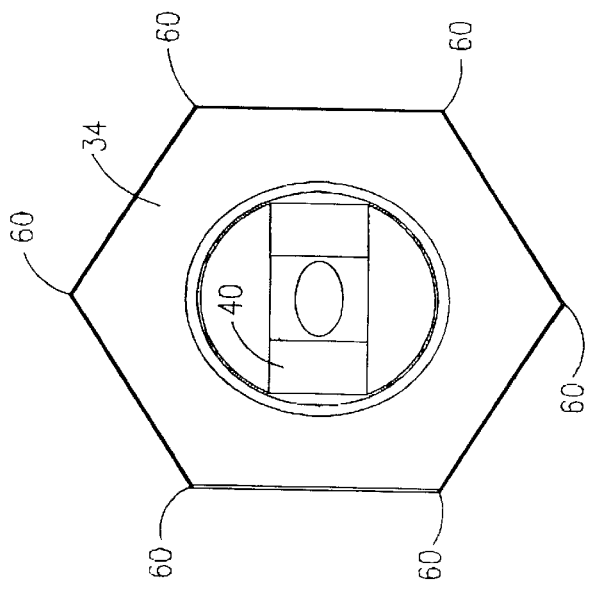
FIGS. 10, 11 and 12 are simplified pictorial illustrations (top, bottom and side views, respectively) of a bubble vial housing comprising a clamp-receiving portion that mates with the clamping element of FIGS. 6–9, in accordance with a preferred embodiment of the present invention.
Figure 11:
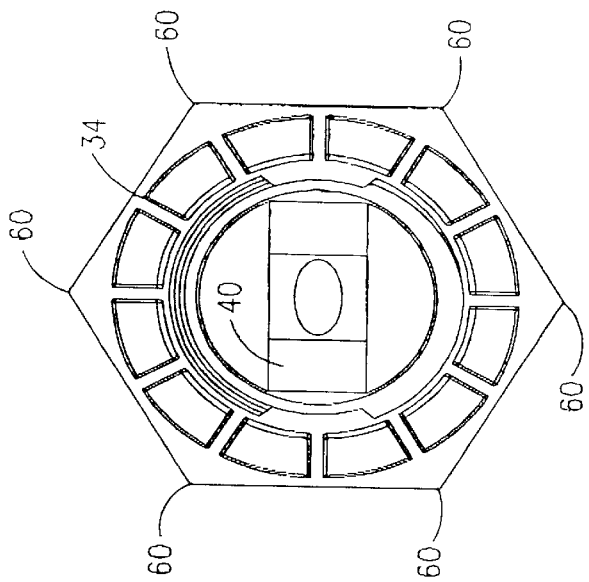
Figure 12:
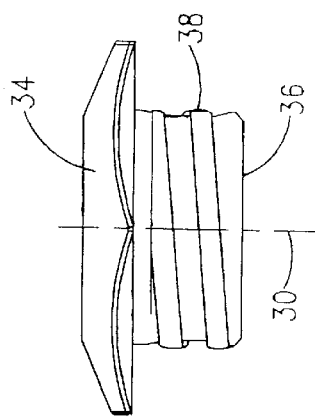

Reference is now made additionally to FIGS. 10–12 which illustrate a bubble vial housing 34, which has a clamp-receiving portion 36, formed with an externally threaded shank 38. Clamping element 24 mates with clamp-receiving portion 36 by the action of shanks 26 and 38 screwing together. It is appreciated that alternative methods of clamping may be provided. For example, shank 26 may be externally threaded and shank 38 may be internally threaded. Clamping element 24 may mate by a press fit with bubble vial housing 34. The skilled artisan will appreciate that these are just a few examples of many other possibilities of clamping clamping element 24 with bubble vial housing 34. A bubble vial 40, such as a tubular bubble vial, is secured to bubble vial housing 34. Bubble vial housing 34 turns about turning axis 30, and is placed through a recess 42 (FIG. 4) formed in member 16.

Figure 4:
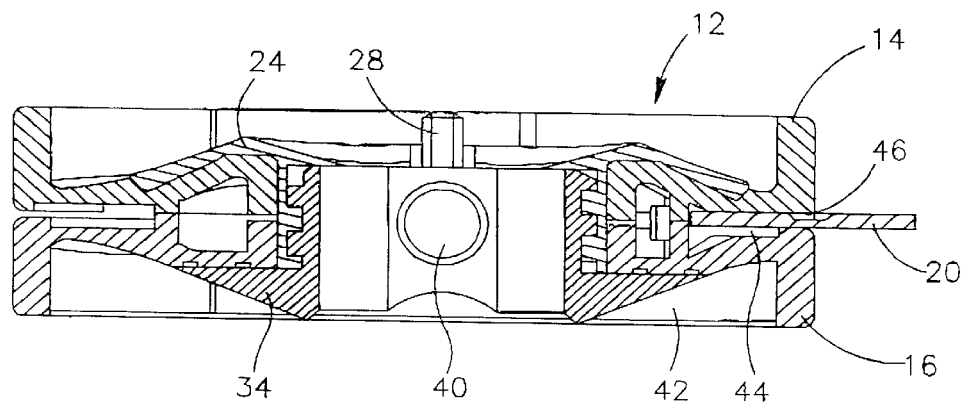
FIGS. 4 and 5 are simplified sectional illustrations of the combination square of FIGS. 1–3, taken along lines IV—IV in FIG. 3, and lines V—V in FIG. 1, respectively.
Figure 5:
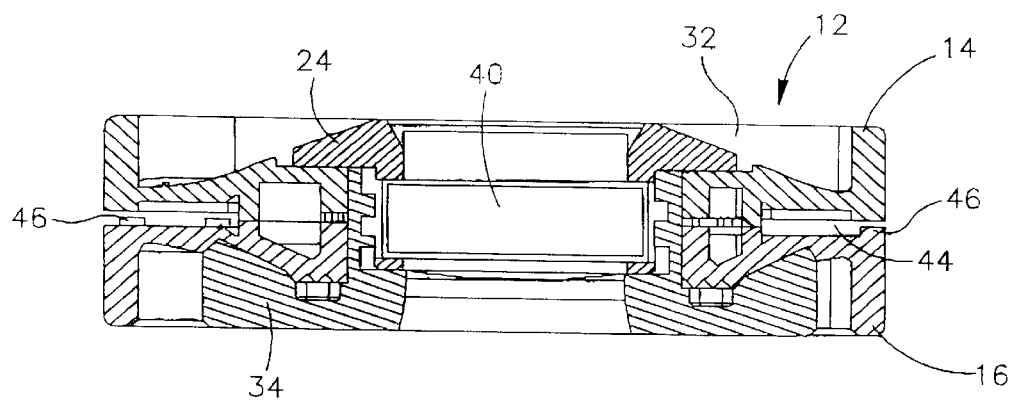
Figure 6:
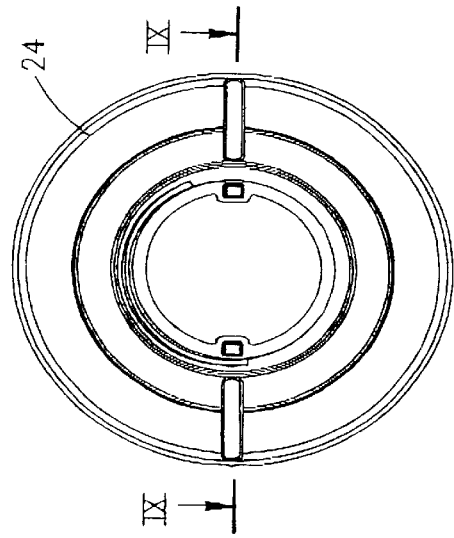
FIGS. 6 and 7 are simplified pictorial illustrations (top and bottom views, respectively) of a clamping element used in the combination square of FIGS. 1–3, in accordance with a preferred embodiment of the present invention.
Figure 7:
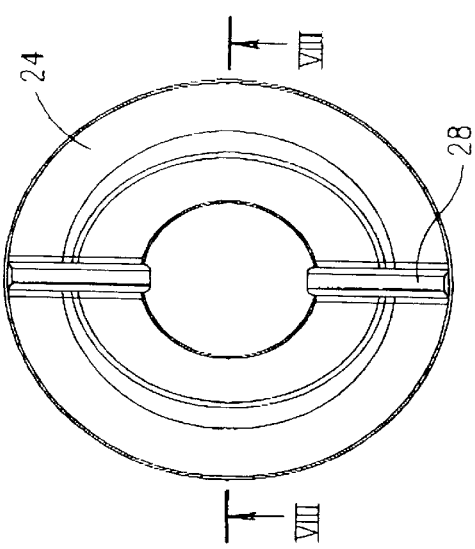
Figure 8:
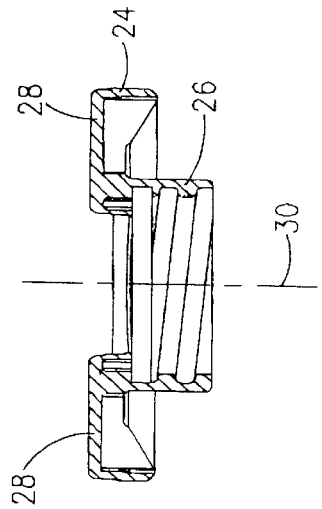
FIGS. 8 and 9 are simplified sectional illustrations of the clamping element of FIGS. 6–8, taken along lines VIII—VIII in FIG. 6 and lines IX—IX in FIG. 7, respectively.
Figure 9:
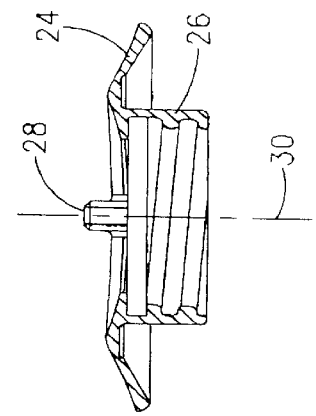

Reference is now made to FIGS. 4 and 5. Opposing members 14 and 16 define a recess 44 therebetween for receiving therein rule member 20. Each opposing member 14 and 16 is preferably formed with a plurality of bosses 46. Bosses 46 may be formed in the shape of generally circular protuberances, oblong nibs or elongate, ridge-like projections, for example. One of the purposes of bosses 46 is to engage longitudinal grove 22 of rule member 20 when opposing members 14 and 16 are clamped against rule member 20, as is seen in FIG. 4. Another purpose is to serve as guides for sliding rule member 20.

Figure 13:
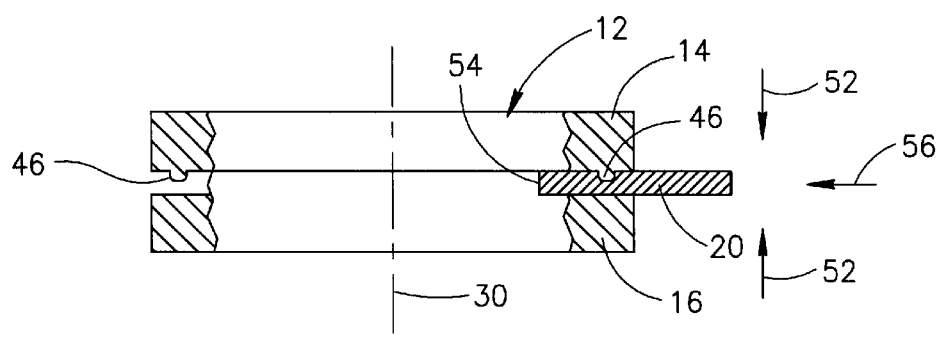
FIGS. 13 and 14 are simplified, partially sectional illustrations of opposing members of the body of the combination square of FIGS. 1–3 respectively clamping and releasing a rule member, in accordance with a preferred embodiment of the present invention.
Figure 14:
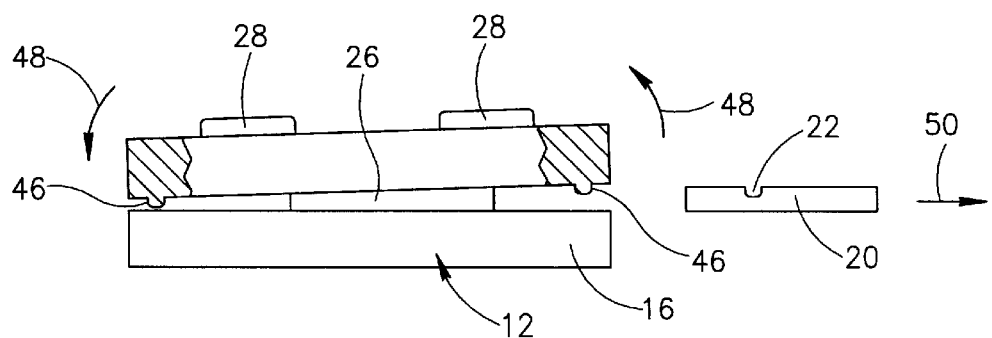

Reference is now additionally made to FIGS. 13 and 14. FIG. 13 shows opposing members 14 and 16 clamped against rule member 20, as seen previously in FIG. 4. When it is desired to slide body 12 and rule member 20 with respect to each other, clamping element 24 is loosened by appropriate turning about turning axis 30. As seen in FIG. 14, after turning clamping element 24 by means of finger grips 28, opposing member 14 may be slightly tilted in the direction of an arrow 48, so that the boss 46 that grips groove 22 is moved away and eases the pressure from groove 22. This allows sliding rule member 20 in a direction perpendicular to the drawing sheet of FIG. 14 or removing rule member 20 from body 12 in the direction of an arrow 50. (The tilting of member 14 is exaggerated in FIG. 14 for the purposes of clarity.) An opposing boss 46 acts as a fulcrum against which opposing members 14 and 16 pivot or tilt with respect to each other to allow sliding or removing rule member 20.

Thus, clamping element 24 is turned about turning axis 30 to apply a clamping force via body 12 on rule member 20. It is seen clearly in FIGS. 13 and 14 that turning axis 30 does not traverse rule member 20. This is in contrast to the prior art, wherein the turning axis of the thumbscrew of most combination squares traverses the rule member at an edge thereof, or wherein the screw clamps directly down against the face of the rule member, as in U.S. Pat. No. 2,296,531.

In one embodiment of the present invention, bosses 46 of opposing members 14 and 16 clamp against groove 22 of rule member 20, and generally apply a clamping force only in the direction of opposing arrows 52. There is substantially no force component perpendicular to the forces applied in the direction of arrows 52. In an alternative embodiment, bosses 46 may be fashioned so as to grip groove 22 and also force an edge of rule member 20 against an internal surface 54 (FIG. 13) of one or more of the opposing members 14 and 16. In such an embodiment, a force component is applied to rule member 20 in the direction of an arrow 56, generally perpendicular to the forces applied in the direction of arrows 52, as seen in FIG. 13.

Figure 15:
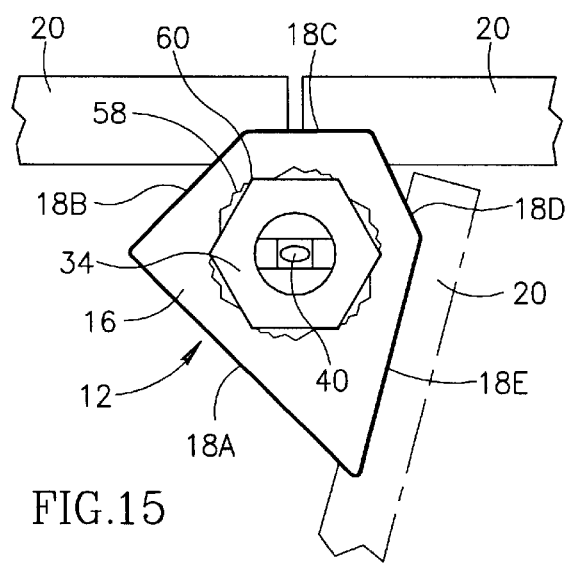
FIG. 15 is a simplified pictorial illustration of the rule member removed from the body of the combination square of FIGS. 1–3 and re-attached to the body at a different orientation, in accordance with a preferred embodiment of the present invention.

Referring again to FIG. 2, it is seen that member 16 of body 12 is formed with a plurality of notches 58. Bubble vial housing 34 is preferably fashioned as a polygon with a plurality of corners 60 (such as a hexagon with 6 corners). Bubble vial housing 34 may be secured in a first orientation in one of the notches 58 by fitting therein corners 60. For example, in FIG. 2, rule member 20 is fitted to body 12 at straightedged surface 18B, and bubble vial housing 34 is arranged so that bubble vial 40 is generally parallel to straightedged surface 18B. Referring now to FIG. 15, it is seen that rule member 20 may be removed from body 12 and re-attached to body 12 at a different orientation. For example, rule member 20 may be fitted to body 12 at straightedged surface 18C, and bubble vial housing 34 may be rotated with respect to the first orientation and secured in a second, different orientation in different notches 58, so that bubble vial 40 is generally parallel to straightedged surface 18C. Rule member 20 may be flipped over so that groove 22 faces either in the direction of bubble vial 40 or faces away therefrom.

It is noted that each straightedged surface 18A–18E may have rule member 20 pass therethrough. It is further noted that optionally more than one rule member 20 may be fitted to body 12 at the same time, as seen in FIG. 15, such an arrangement being useful in setting steps in stairways, for example.

It will be appreciated by person skilled in the art, that the present invention is not limited by what has been particularly shown and described herein above. Rather the scope of the present invention is defined only by the claims that follow:

What is claimed is:

1. A combination square comprising:

a body comprising two opposing members, each having a plurality of straightedged surfaces, and a clamping element adapted to clamp said opposing members together, said opposing members defining a recess therebetween for receiving therein a rule member; and a rule member having a longitudinal groove formed therein, wherein said opposing members clamp against said longitudinal groove, and wherein said opposing members comprise a fulcrum against which they pivot to release said rule member.

2. The combination square according to claim 1 wherein said opposing members are generally mirror images of each other.

3. The combination square according to claim 1 wherein said clamping element is attachable to said body and rotatable about a turning axis so as to apply a clamping force via said body on the rule member, said turning axis not traversing the rule member.

4. The combination square according to claim 1 and further comprising a bubble vial housing adapted to be secured to said body, said bubble vial housing comprising a clamp-receiving portion, wherein said clamping element mates with said clamp-receiving portion.

5. The combination square according to claim 4 wherein said body is formed with a plurality of notches, and said bubble vial housing is adapted to be secured in a first orientation in at least one of said notches, and to be secured in a second orientation, rotated with respect to the first orientation, in at least one of another of said notches.

6. The combination square according to claim 1 and farther comprising a plurality of said rule members passing through at least one of said straightedged surfaces at the same time.

7. The combination square according to claim 1 wherein some of said plurality of straightedged surfaces are angled with respect to each other at 45° and 90°, and at least one additional straightedged surface is angled with respect to the other straightedged surfaces at an angle different from 45° and 90°.

8. A combination square comprising:

a body comprising two opposing members, each having a plurality of straightedged surfaces, and a clamping element adapted to clamp said opposing members together, said opposing members defining a recess therebetween for receiving therein a rule member, wherein each of said staightedged surfaces is adapted to have a rule member pass therethrough.

9. A combination square comprising:

a body comprising two opposing members that are generally mirror images of each other, and a clamping element adapted to clamp said opposing members together, said opposing members defining a recess therebetween for receiving therein a rule member; and a rule member having a longitudinal groove formed therein, wherein said opposing members clamp against said longitudinal groove, and wherein said opposing members comprise a fulcrum against which they pivot to release said rule member.

10. A combination square comprising:

a body having a plurality of straightedged surfaces angled with respect to each other at 45° and 90°, and at least one additional straightedged surface angled with respect to the other straightedged surfaces at an angle different from 45° and 90°, said body having a recess for receiving therein a rule member, wherein said body comprises two opposing members, each having a plurality of straightedged surfaces; and a rule member having a longitudinal groove formed therein, wherein said opposing members clamp against said longitudinal groove, and wherein said opposing members comprise a fulcrum against which they pivot to release said rule member.

11. A combination square comprising:

a body comprising two opposing members, each having a plurality of straightedged surfaces and defining a recess therebetween for receiving therein a rule member;

a clamping element adapted to clamp said opposing members together; and a plurality of rule members passing through at least one of said straightedged surfaces at the same time.

12. The combination square according to claim 11 wherein said opposing members are generally mirror images of each other.

13. The combination square according to claim 11 wherein each of said rule members has a longitudinal groove formed therein, and said opposing members clamp against said longitudinal groove.

14. The combination square according to claim 12 wherein said opposing members comprise a fulcrum against which they pivot to release said rule member.

15. The combination square according to claim 11 wherein said clamping element is attachable to said body and rotatable about a turning axis so as to apply a clamping force via said body on the rule members, said turning axis not traversing the rule members.

16. The combination square according to claim 11 and further comprising a bubble vial housing adapted to be secured to said body, said bubble vial housing comprising a clamp-receiving portion, wherein said clamping element mates with said clamp-receiving portion.

17. The combination square according to claim 16 wherein said body is formed with a plurality of notches, and said bubble vial housing is adapted to be secured in a first orientation in at least one of said notches, and to be secured in a second orientation, rotated with respect to the first orientation, in at least one of another of said notches.

18. The combination square according to claim 11 wherein some of said plurality of straightedged surfaces are angled with respect to each other at 45° and 90°, and at least one additional straightedged surface is angled with respect to the other straightedged surfaces at an angle different from 45° and 90°.

* * * * *